United States Patent
Otsugu et al.

(10) Patent No.: US 9,340,633 B2
(45) Date of Patent: May 17, 2016

(54) TREATMENT METHOD FOR FLUORORESIN PELLETS

(71) Applicant: ASAHI GLASS COMPANY, LIMITED, Chiyoda-ku (JP)

(72) Inventors: Satoshi Otsugu, Tokyo (JP); Yuji Tanonaka, Tokyo (JP); Atsushi Tsuji, Tokyo (JP); Shigeru Aida, Tokyo (JP); Akio Ogawa, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/147,907

(22) Filed: Jan. 6, 2014

(65) Prior Publication Data

US 2014/0121331 A1 May 1, 2014

Related U.S. Application Data

(63) Continuation of application No. PCT/JP2012/067001, filed on Jul. 3, 2012.

(30) Foreign Application Priority Data

Jul. 5, 2011 (JP) ................................. 2011-148833

(51) Int. Cl.
- *C08F 214/26* (2006.01)
- *B29B 9/16* (2006.01)
- *C08J 3/12* (2006.01)
- *C08F 6/28* (2006.01)
- *B29B 9/06* (2006.01)

(52) U.S. Cl.
CPC ............... *C08F 214/265* (2013.01); *B29B 9/16* (2013.01); *C08F 6/28* (2013.01); *C08F 214/26* (2013.01); *C08J 3/12* (2013.01); *B29B 9/06* (2013.01); *B29B 9/065* (2013.01); *B29B 2009/168* (2013.01); *C08J 2327/12* (2013.01)

(58) Field of Classification Search
None
See application file for complete search history.

(56) References Cited

U.S. PATENT DOCUMENTS

| | | | |
|---|---|---|---|
| 5,861,464 A * | 1/1999 | Goldmann et al. | 525/326.4 |
| 2003/0125400 A1* | 7/2003 | Komori et al. | 521/40.5 |
| 2003/0168405 A1* | 9/2003 | Ichida et al. | 210/639 |

FOREIGN PATENT DOCUMENTS

| | | |
|---|---|---|
| CN | 101920980 B | 1/2012 |
| EP | 0 220 910 A2 | 5/1987 |
| EP | 0 780 403 A2 | 6/1997 |
| EP | 0 780 403 A3 | 6/1997 |
| EP | 1 227 110 A1 | 7/2002 |
| EP | 1 336 627 A1 | 8/2003 |
| JP | 11-116710 | 4/1999 |
| JP | 2008-31366 | 2/2008 |
| WO | WO 2004/044014 A2 | 5/2004 |
| WO | 2010/074039 | 7/2010 |
| WO | WO-2010/074039 A1 * | 7/2010 |
| WO | WO 2011/007705 A1 | 1/2011 |
| WO | WO-2013/005743 A1 * | 1/2013 |

OTHER PUBLICATIONS

Wang Zhanqian, et al. "Progress in Processing Technologies of Hydrogen Fluoride", Chemical Production and Technology, vol. 16, No. 6, 2009, 6 pages (with English Abstracts).
International Search Report issued Oct. 2, 2012 in PCT/JP2012/067001 filed Jul. 3, 2012.
Fluororesin Handbook, compiled by Takatomi Satokawa, Nikkan Kogyo Shimbun, Ltd., published in 1990, p. 471-474.
Extended European Search Report issued on Jan. 20, 2015 in Application No. 12807013.3.
"Material Safety Data Sheet" Hydrofluoric Acid, Kanto Chemical Co., Inc., No. 18083, Feb. 3, 2010, 7 Pages.

* cited by examiner

*Primary Examiner* — Peter D Mulcahy
*Assistant Examiner* — Henry Hu
(74) *Attorney, Agent, or Firm* — Oblon, McClelland, Maier & Neustadt, L.L.P.

(57) ABSTRACT

Provided is a treatment method for fluororesin pellets to remove hydrofluoric acid released from fluororesin pellets obtained by melt-molding a melt-moldable fluororesin. The treatment method comprises bringing a hydrofluoric acid-removing medium selected from warm water of from 30 to 200° C., steam of from 100 to 200° C. and warm wind of from 40 to 200° C. into contact with fluororesin pellets obtained by melt-molding a melt-moldable fluororesin, and thereby treating the fluororesin pellets so that the amount of hydrofluoric acid released per kg of the resulting fluororesin pellets would be at most 5 μg as determined after the storage of the resulting fluororesin pellets at 35° C. for 15 days.

11 Claims, No Drawings

TREATMENT METHOD FOR FLUORORESIN PELLETS

This application is a continuation of PCT Application No. PCT/JP2012/067001, filed on Jul. 3, 2012, which is based upon and claims the benefit of priority from Japanese Patent Application No. 2011-148833 filed on Jul. 5, 2011. The contents of those applications are incorporated herein by reference in its entirety.

TECHNICAL FIELD

The present invention relates to a treatment method for fluororesin pellets to suppress release of hydrofluoric acid from fluororesin pellets obtained by melt-molding a melt-moldable fluororesin.

BACKGROUND ART

As one of melt-moldable fluororesins, an ethylene/tetrafluoroethylene copolymer (hereinafter sometimes referred to also as ETFE) is available. A melt-moldable fluororesin is excellent in heat resistance, chemical resistance, electrical insulating properties, flame retardancy, weather resistance and melt-moldability and thus is used as an insulating covering material for electric wires to be used for e.g. aircrafts, atomic power plants, automobiles, industrial robots, etc.

Such a melt-moldable fluororesin is produced in the form of fine fluororesin particles, by a polymerization method such as solution polymerization or suspension polymerization. The obtained fine fluororesin particles are granulated into fluororesin beads and then melt-molded in a pellet form to obtain fluororesin pellets. Such fluororesin pellets are used as a molding material to produce various products. The fluororesin pellets are excellent in handling efficiency at the time of the molding process for such various products.

By the way, if a fluororesin containing hydrogen and fluorine in the main chain, such as ETFE, is held at a high temperature for a long time, hydrofluoric acid (HF) may sometimes be released from the main chain. Further, as disclosed in Non-patent Document 1, it is known that ETFE generates a gas containing hydrofluoric acid at the melt-molding temperature.

Hydrofluoric acid shows very high solubility in water, and therefore, hydrofluoric acid is not substantially contained in fluororesin beads obtained by granulating fine fluororesin particles obtained by polymerization, by using an aqueous medium.

However, at the time of melt-molding the fluororesin beads in a pellet form, hydrofluoric acid may sometimes be released from the main chain of the fluororesin. Therefore, hydrofluoric acid may sometimes be contained in the fluororesin pellets. If hydrofluoric acid is contained in the fluororesin pellets, hydrofluoric acid will be released from the fluororesin pellets to a gas phase as the time passes. Accordingly, in a case where the fluororesin pellets are stored in a closed place for a long period of time, or in a case where they are stored at a high temperature in summer time, an odor of the acid may sometimes be smelled.

PRIOR ART DOCUMENT

Non-Patent Document

Non-patent Document 1: Fluororesin Handbook, compiled by Takatomi Satokawa, Nikkan Kogyo Shimbun, Ltd., published in 1990, p. 471-474

DISCLOSURE OF INVENTION

Technical Problem

An object of the present invention is to provide a treatment method for fluororesin pellets to suppress release of hydrofluoric acid from fluororesin pellets obtained by melt-molding a melt-moldable fluororesin.

Solution to Problem

The present invention provides the following:

[1] A treatment method for fluororesin pellets, which comprises bringing a hydrofluoric acid-removing medium selected from warm water of from 30 to 200° C., steam of from 100 to 200° C. and warm wind of from 40 to 200° C. into contact with fluororesin pellets obtained by melt-molding a melt-moldable fluororesin, and thereby treating the fluororesin pellets so that the amount of hydrofluoric acid released per kg of the resulting fluororesin pellets would be at most 5 μg as determined after the storage of the resulting fluororesin pellets at 35° C. for 15 days.

[2] The treatment method for fluororesin pellets according to the above [1], wherein warm water of from 30 to 200° C. is contacted with the fluororesin pellets for at least 10 seconds.

[3] The treatment method for fluororesin pellets according to the above [1], wherein steam of from 100 to 200° C. is contacted with the fluororesin pellets for at least 10 seconds.

[4] The treatment method for fluororesin pellets according to the above [1], wherein warm wind of from 40 to 200° C. is contacted with the fluororesin pellets for at least 30 minutes.

[5] The treatment method for fluororesin pellets according to the above [4], wherein the volume flow rate of the warm wind is from 5 to 50 m$^3$/hr.

[6] The treatment method for fluororesin pellets according to any one of the above [1] to [5], wherein the average particle size of the fluororesin pellets is from 1.0 to 5.0 mm.

[7] The treatment method for fluororesin pellets according to any one of the above [1] to [6], wherein the bulk density of the fluororesin pellets is from 0.5 to 1.5 g/ml.

[8] The treatment method for fluororesin pellets according to any one of the above [1] to [7], wherein the melt-moldable fluororesin is an ethylene/tetrafluoroethylene copolymer.

[9] The treatment method for fluororesin pellets according to the above [8], wherein the ethylene/tetrafluoroethylene copolymer comprises repeating units derived from tetrafluoroethylene, repeating units derived from ethylene and repeating units derived from a compound represented by $CH_2$=$CX(CF_2)_nY$ wherein each of X and Y which are independent of each other, is a hydrogen atom or a fluorine atom, and n is an integer of from 2 to 8; the molar ratio of repeating units derived from ethylene/repeating units derived from tetrafluoroethylene is from 80/20 to 20/80; and the content of repeating units derived from the compound represented by $CH_2$=$CX(CF_2)_nY$ is from 0.01 to 20 mol % to all repeating units in the ethylene/tetrafluoroethylene copolymer.

Advantageous Effects of Invention

According to the present invention, the above hydrofluoric acid-removing medium is brought in contact with fluororesin pellets obtained by melt-molding a melt-moldable fluororesin, whereby hydrofluoric acid is removed from the surface of the fluororesin pellets or from the vicinity thereof, and release of hydrofluoric acid from the fluororesin pellets is suppressed. And, by contacting the hydrofluoric acid-removing medium for the treatment so that the amount of hydrofluoric acid released per kg of the resulting fluororesin pellets would be at most 5 μg as determined after the storage of the resulting fluororesin pellets at 35° C. for 15 days, it is possible to suppress the release of hydrofluoric acid into the atmosphere during the storage for a long period of time or during the storage at a high temperature. Therefore, even after the long period storage or high temperature storage, the acidic odor derived from hydrofluoric acid is suppressed, whereby the handling efficiency or working efficiency of the fluororesin pellets will be improved.

DESCRIPTION OF EMBODIMENTS

In the treatment method for fluororesin pellets of the present invention, fluororesin pellets obtained by melt-molding a melt-moldable fluororesin are used as the object to be treated. Among them, a fluororesin containing hydrogen atoms in its main chain or a fluororesin containing hydrogen at its polymer chain terminals and having flexibility is particularly suitable for the treatment method of the present invention, since hydrofluoric acid will be generated by desorption of hydrofluoric acid from the main chain or by decomposition of the chain terminals, when such a fluororesin is held at a high temperature for a long period of time.

The melt-moldable fluororesin containing hydrogen atoms in its main chain may, for example, be an ethylene/tetrafluoroethylene copolymer (ETFE), polyvinylidene fluoride (PVDF), a chlorotrifluoroethylene/ethylene copolymer (ECTFE) or a tetrafluoroethylene/hexafluoropropylene/vinylidene fluoride (THV). The fluororesin containing hydrogen at its polymer chain terminals and having flexibility may, for example, be a tetrafluoroethylene/perfluoroalkyl vinyl ether copolymer (PFA), a tetrafluoroethylene/hexafluoropropylene copolymer (FEP) or polychlorotrifluoroethylene (PCTFE). Particularly preferred is ETFE. ETFE is particularly suitable for treatment by the present invention, since a very small amount of hydrofluoric acid is likely to be generated at the melt-molding temperature, and therefore, in pellets obtained by melt-molding ETFE, hydrofluoric acid is contained in many cases.

Now, ETFE will be described in detail.

In the present invention, ETFE is preferably ETFE obtained by copolymerizing ethylene, tetrafluoroethylene and, if necessary, other monomers, in the presence of a polymerization medium together with a radical polymerization initiator, a chain transfer agent to adjust the molecular weight, etc. at a predetermined temperature for a predetermined time with stirring. When ETFE is produced in the presence of a polymerization medium, an ETFE slurry having fine particles of ETFE dispersed in the medium is obtainable. The ETFE concentration in the ETFE slurry is preferably from 50 to 200 g/L (liters) (polymerization medium), more preferably from 100 to 180 g/L (polymerization medium). If the ETFE concentration is lower than this range, the yield of granules per batch tends to be small, and the productivity tends to decrease. If the ETFE concentration is higher than this range, agglomeration of fine ETFE particles is likely to occur, and when fine ETFE particles are granulated, agglomerates of fine ETFE particles are likely to be contained in the obtainable ETFE beads. When it is within the above preferred range, fine ETFE particles tend to be scarcely agglomerated, and it is possible to produce ETFE beads containing little agglomerates with good productivity.

ETFE is preferably one comprising repeating units derived from ethylene (hereinafter sometimes referred to as "E") and repeating units derived from tetrafluoroethylene (hereinafter sometimes referred to as "TFE"). The molar ratio of (repeating units derived from E)/(repeating units derived from TFE) is preferably from 80/20 to 20/80, more preferably from 70/30 to 30/70, most preferably from 50/50 to 35/65.

If the molar ratio of (repeating units derived from E)/(repeating units derived from TFE) is excessively large, the heat resistance, weather resistance, chemical resistance, chemical barrier performance, etc. of ETFE may sometimes decrease. On the other hand, if such a molar ratio is excessively small, the mechanical properties, melt-moldability, etc. of ETFE may sometimes decrease. When such a molar ratio is within the above range, ETFE will be excellent in heat resistance, weather resistance, chemical resistance, chemical barrier performance, mechanical properties, melt-moldability, etc.

Further, in the present invention, ETFE may contain, in addition to repeating units derived from E and repeating units derived from TFE, repeating units derived from other monomers within a range not to impair the essential characteristics of ETFE.

As such other monomers, the following (1) to (7) may be mentioned. One or more of such other monomers may be used.

(1) An α-olefin (other than E) such as propylene or butene.

(2) A compound represented by the formula $CH_2CX(CF_2)_nY$, wherein each of X and Y which are independent of each other, is a hydrogen atom or a fluorine atom, and n is an integer of from 2 to 8.

(3) A fluoroolefin having a hydrogen atom in an unsaturated group, such as vinylidene fluoride (VDF), vinyl fluoride (VF), trifluoroethylene or hexafluoroisobutylene (HFIB).

(4) A fluoroolefin having no hydrogen atom in an unsaturated group (other than TFE), such as hexafluoropropylene (HFP) or chlorotrifluoroethylene (CTFE).

(5) A perfluoro(alkyl vinyl ether) (PAVE) such as perfluoro(methyl vinyl ether) (PMVE), perfluoro(ethyl vinyl ether) (PEVE), perfluoro(propyl vinyl ether) (PPVE) or perfluoro(butyl vinyl ether) (PBVE).

(6) A perfluoro vinyl ether having two unsaturated bonds, such as $CF_2=CFOCF_2CF=CF_2$ or $CF_2=CFO(CF_2)_2CF=CF_2$.

(7) A fluoromonomer having an alicyclic structure, such as perfluoro(2,2-dimethyl-1,3-dioxole) (PDD), 2,2,4-trifluoro-5-trifluoromethoxy-1,3-dioxole or perfluoro(2-methylene-4-methyl-1,3-dioxolane).

Among them, a compound represented by $CH_2=CX(CF_2)_nY$ (hereinafter referred to as "FAE") is preferred as other monomers. With FAE, if n in the formula is less than 2, the properties of an ETFE molded product sometimes tend to be inadequate (e.g. the ETFE undergoes stress cracking), and if n in the formula exceeds 8, the polymerization reactivity sometimes tends to be inadequate. When n is within the above range, the ETFE molded product will be excellent in the properties, and FAE will be excellent in the polymerization reactivity.

FAE may, for example, be $CH_2=CF(CF_2)_2F$, $CH_2=CF(CF_2)_3F$, $CH_2=CF(CF_2)_4F$, $CH_2=CF(CF_2)_5F$, $CH_2=CF(CF_2)_8F$, $CH_2=CF(CF_2)_2H$, $CH_2=CF(CF_2)_3H$, $CH_2=CF(CF_2)_4H$, $CH_2=CF(CF_2)_5H$, $CH_2=CF(CF_2)_8H$, $CH_2=CH(CF_2)_2F$, $CH_2=CH(CF_2)_3F$, $CH_2=CH(CF_2)_4F$, $CH_2=CH(CF_2)_5F$, $CH_2=CH(CF_2)_8F$, $CH_2=CH(CF_2)_2H$, $CH_2=CH(CF_2)_3H$, $CH_2=CH(CF_2)_4H$, $CH_2=CH(CF_2)_5H$ or $CH_2=CH(CF_2)_8H$. One type of FAE may be used alone, or two or more types thereof may be used in combination.

Among them, a compound represented by $CH_2=CH(CF_2)_nY$ is more preferred. With respect to n in the formula, n=from 2 to 6 is further preferred, and n=from 2 to 4 is most preferred. When n is within such a range, the ETFE molded product will be excellent in stress crack resistance.

In ETFE, the content of repeating units derived from FAE is preferably from 0.01 to 20 mol %, more preferably from 0.1 to 15 mol %, most preferably from 1 to 10 mol %, to all repeating units in the ETFE. If the content of FAE is less than 0.01 mol %, the stress crack resistance of the ETFE molded product tends to be low, and a breakage phenomenon such as cracking under a stress may sometimes occur. On the other hand, if it exceeds 20 mol %, the mechanical properties of the ETFE molded product will sometimes be low. When the content of FAE is within the above range, the ETFE molded product will be excellent in the properties.

The polymerization medium to be used for the polymerization of ETFE may, for example, be an organic solvent such as a fluorinated hydrocarbon, a chlorinated hydrocarbon, a fluorochlorinated hydrocarbon, an alcohol or a hydrocarbon. Specific examples of the polymerization medium include a perfluorocarbon such as n-perfluorohexane, n-perfluoroheptane, perfluorocyclobutane, perfluorocyclohexane or perfluorobenzene; a hydrofluorocarbon such as 1,1,2,2-tetrafluorocyclobutane, $CF_3CFHCF_2CF_2CF_3$, $CF_3(CF_2)_4H$, $CF_3CF_2CFHCF_2CF_3$, $CF_3CFHCFHCF_2CF_3$, $CF_2HCFHCF_2CF_2CF_3$, $CF_3(CF_2)_5H$, $CF_3CH(CF_3)CF_2CF_2CF_3$, $CF_3CF(CF_3)CFHCF_2CF_3$, $CF_3CF(CF_3)CFH-CFHCF_3$, $CF_3CH(CF_3)CFHCF_2CF_3$, $CF_3CF_2CH_2CH_3$ or $CF_3(CF_2)_3CH_2CH_3$; and a hydrofluoroether such as $CF_3CH_2OCF_2CF_2H$, $CF_3(CF_3)CFCF_2OCH_3$ or $CF_3(CF_2)_3OCH_3$. Among them, $CF_3(CF_2)_5H$ or $CF_3CH_2OCF_2CF_2H$ is more preferred, and $CF_3(CF_2)_5H$ is most preferred.

The radical polymerization initiator to be used for the polymerization of ETFE is preferably a radical polymerization initiator, of which the temperature at which its half-life period is 10 hours, is from 0 to 100° C., more preferably a radical polymerization initiator, of which such a temperature is from 20 to 90° C. Specific examples of the radical polymerization initiator include an azo compound such as azobisisobutylonitrile; a peroxy dicarbonate such as diisopropyl peroxy dicarbonate; a peroxy ester such as tert-butyl peroxy pivalate, tert-butyl peroxy isobutylate or tert-butyl peroxy acetate; a non-fluorinated diacyl peroxide such as isobutyl peroxide, octanoyl peroxide, benzoyl peroxide or lauroyl peroxide; a fluorinated diacyl peroxide such as $(Z(CF_2)_pCOO)_2$, wherein Z is a hydrogen atom, a fluorine atom or a chlorine atom, and p is an integer of from 1 to 10; perfluoro tert-butyl peroxide; and an inorganic peroxide such as potassium peroxide, sodium peroxide or ammonium peroxide.

The chain transfer agent to be used for the polymerization of ETFE may, for example, be an alcohol such as methanol, ethanol, 2,2,2-trifluoroethanol, 2,2,3,3-tetrafluoropropanol, 1,1,1,3,3,3-hexafluoroisopropanol or 2,2,3,3,3-pentafluoropropanol; a fluorochlorinated hydrocarbon such as 1,3-dichloro-1,1,2,2,3-pentafluoropropane or 1,1-dichloro-1-fluoroethane; a hydrocarbon such as n-pentane, n-hexane, n-heptane or cyclohexane; a hydrofluorocarbon such as $CF_2H_2$, a ketone such as acetone; a mercaptan such as methyl mercaptan; an ester such as methyl acetate or ethyl acetate; or an ether such as diethyl ether or methyl ethyl ether.

The polymerization conditions for ETFE are not particularly limited. The polymerization temperature is preferably from 0 to 100° C., more preferably from 20 to 90° C. The polymerization pressure is preferably from 0.1 to 10 MPa, more preferably from 0.5 to 3 MPa. The polymerization time is preferably from 1 to 30 hours, more preferably from 2 to 20 hours.

Now, a method for producing fluororesin pellets will be described with reference to a case where ETFE is used as a melt-moldable fluororesin. Further, also in the case of a fluororesin other than ETFE, fluororesin pellets may be produced in the same manner.

Firstly, fine particles of ETFE obtained by polymerization are granulated to produce ETFE beads. The granulation is preferably conducted by transporting fine particles of ETFE, a polymerization medium and non-reacted monomers such as ethylene and tetrafluoroethylene contained in an ETFE slurry, as they are, from the polymerization vessel to a granulation vessel via a piping. In the granulation vessel, water to be a dispersing medium for ETFE granules is added in a predetermined amount to the ETFE slurry, and then, in the granulation vessel, the ETFE slurry and water are heated with stirring to granulate fine particles of ETFE while distilling off volatile components such as non-reacted monomers, the polymerization medium, the chain transfer agent, etc., thereby to produce ETFE beads.

In the granulation step, the pressure in the granulation vessel increases by vapors of components such as the non-reacted monomers, the polymerization medium, etc. Therefore, it is preferred to carry out the granulation while continuously distilling and recovering such components from the granulation vessel so that the pressure in the granulation vessel becomes constant. The non-reacted monomers and the polymerization medium distilled from the granulation vessel are preferably passed through a heat exchanger and a dehydrating tower, then recovered in a gas holder and a polymerization medium tank, and reused.

ETFE beads thus obtained are melt-molded in a pellet form to obtain ETFE pellets. The molding method is not particularly limited, and a conventional method may be used. For example, a method may be mentioned wherein by means of a single screw extruder, a twin screw extruder or a tandem extruder, ETFE is melt-extruded, and the melt-extruded ETFE is cooled and solidified and then cut in a predetermined length to form pellets. At the time of the melt-extrusion, the extrusion temperature is required to be adjusted depending upon the melt viscosity of the resin or the production method, and it is preferably from the melting point of the resin +20° C. to the melting point of the resin +120° C. The method for cutting the cooled and solidified ETFE is not particularly limited, and a conventional method such as a strand cut system, a hot cut system, an underwater cut system or a sheet cut system, may be employed.

The bulk density of the fluororesin pellets to be used for the treatment method of the present invention is preferably from 0.5 to 1.5 g/ml, more preferably from 0.8 to 1.2 g/ml, most preferably from 0.9 to 1.1 g/ml. When the bulk density is in the above range, at the time of producing a molded product of fluororesin by using the fluororesin pellets, the handling efficiency is good. Here, in the present invention, the value of the bulk density is a value measured in accordance with JIS K6891 Test Method for Molded Powder of Tetrafluoroethylene Resin, as will be shown in Examples given hereinafter.

The average particle size of the fluororesin pellets to be used in the treatment method of the present invention, is preferably from 1.0 to 5.0 mm, more preferably from 1.5 to 3.5 mm, most preferably from 2.0 to 3.0 mm. If the average particle size of the fluororesin pellets is too small, the handling efficiency at the time of producing a fluororesin molded product by using the fluororesin pellets is likely to be impaired. If the average particle size of the fluororesin pellets is too large, the proportion of the surface area to the volume of the fluororesin pellets becomes small, whereby hydrofluoric acid tends to be hardly removed from the fluororesin pellets, and the treatment time tends to be long. Here, in the present invention, the value of the average particle size is a value obtained from the average values by measuring the long diameters and the short diameters of optionally extracted fluororesin pellets, as shown in Examples given hereinafter.

The treatment method for fluororesin pellets of the present invention comprises treatment by bringing a hydrofluoric acid-removing medium selected from warm water of from 30 to 200° C., steam of from 100 to 200° C. and warm wind of from 40 to 200° C. into contact with fluororesin pellets obtained by melt-molding a melt-moldable fluororesin. By contacting such a hydrofluoric acid-removing medium with the fluororesin pellets, the fluororesin pellets are heated, and an hydrofluoric acid present inside is eluted to the surface. And hydrofluoric acid eluted to the surface is removed by the hydrofluoric acid-removing medium, whereby the fluororesin pellets after the treatment will have the amount of hydrofluoric acid to be released, reduced, and it is possible to reduce the odor of hydrofluoric acid in the atmosphere during the storage. Hydrofluoric acid shows very high solubility in water, and therefore, as the hydrofluoric acid-removing medium, warm water or steam is preferred, and warm water is particularly preferred.

The treatment of the fluororesin pellets is carried out until the amount of hydrofluoric acid released per kg of the resulting fluororesin pellets would be at most 5 µg, preferably at most 2 µg, as determined after the storage of the resulting fluororesin pellets at 35° C. for 15 days. By reducing the amount of hydrofluoric acid released per kg of the fluororesin pellets, hydrofluoric acid tends to be scarcely released even after the storage for a long period of time or after the high temperature storage, whereby the working environment will be improved, and the handling efficiency of the fluororesin pellets will be excellent. Here, the value of the amount of hydrofluoric acid released in the present invention means a value measured by the method shown in Examples given hereinafter.

In a case where the treatment is conducted by using warm water as the hydrofluoric acid-removing medium, the temperature of warm water is from 30 to 200° C., preferably from 40 to 100° C., more preferably from 60 to 90° C. If the temperature of warm water is less than 30° C., it takes time for the treatment. If it exceeds 200° C., the temperature becomes close to the melting point of ETFE, whereby melting or deformation of pellets is likely to occur. The treatment time is preferably at least 10 seconds, more preferably from 10 seconds to 60 minutes, particularly preferably from 10 seconds to 1 minute. When the treatment time is at least 10 seconds, the amount of hydrofluoric acid released per kg of the fluororesin pellets can be reduced to at most 5 µg. On the other hand, even if the treatment time exceeds 60 minutes, no substantial improvement in effects is obtainable, and therefore, the upper limit is preferably 60 minutes.

In the treatment method for the fluororesin pellets with warm water, the warm water and the fluororesin pellets may simply be in contact with each other, and a method of immersing the fluororesin pellets in the warm water may be mentioned as an example. During the immersion, the warm water may be mixed by a method such as stirring or vibration. Even if no such mixing treatment is conducted, a sufficient effect is obtainable simply by the immersion in the warm water, and no mixing treatment is usually required.

In a case where the treatment is conducted by using steam as the hydrofluoric acid-removing medium, the temperature of steam is from 100 to 200° C., preferably from 100 to 150° C. If the temperature of steam is less than 100° C., it takes time for the treatment. If it exceeds 200° C., the temperature becomes close to the melting point of ETFE, whereby melting or deformation of pellets is likely to occur. The treatment time is preferably at least 10 seconds, more preferably from 10 seconds to 60 minutes, particularly preferably from 10 seconds to 1 minute. When the treatment time is at least 10 seconds, the amount of hydrofluoric acid released per kg of the fluororesin pellets can be reduced to at most 5 µg. On the other hand, even if the treatment time exceeds 60 minutes, no substantial improvement in effects is obtainable, and therefore, the upper limit is preferably 60 minutes.

In the treatment method for the fluororesin pellets with steam, the steam and the fluororesin pellets may simply be in contact with each other. For example, a method of treatment by blowing steam to the fluororesin pellets, or a method of treatment by placing the fluororesin pellets in a container filled with stream, may be mentioned.

In a case where the treatment is conducted by using warm wind as the hydrofluoric acid-removing medium, the temperature of warm wind is from 40 to 200° C., preferably from 100 to 200° C. If the temperature of warm wind is less than 40° C., it takes time for the treatment. If it exceeds 200° C., the temperature becomes close to the melting point of ETFE, whereby melting or deformation of pellets is likely to occur. The volume flow rate of the warm wind is preferably from 5 to 50 m$^3$/hr, more preferably from 5 to 10 m$^3$/hr. If the volume flow rate is less than 5 m$^3$/hr, the time required for the acid-removing treatment tends to be long, and if it exceeds 50 m$^3$/hr, the pellets are likely to be scattered in the treatment apparatus, and it is possible that the pellets are blown out from the treatment apparatus. The type of warm wind may, for example, be air or nitrogen, preferably air. The treatment time is preferably at least 30 minutes, more preferably from 30 minutes to 2 hours, particularly preferably from 30 minutes to 1 hour. When the treatment time is at least 30 minutes, the amount of hydrofluoric acid released per kg of the fluororesin pellets can be reduced to at most 5 µg. On the other hand, even if the treatment time exceeds 2 hours, no substantial improvement in effects is obtainable, and therefore, the upper limit is preferably 2 hours.

In the treatment method for the fluororesin pellets with warm wind, the warm wind and the fluororesin pellets may simply be in contact with each other. For example, a method of treatment by blowing warm wind to the fluororesin pellets may be mentioned.

EXAMPLES

Now, the present invention will be described with reference to Examples (Ex 1 to 4) and Comparative Examples (Ex 5), but it should be understood that the present invention is by no means limited thereto. Here, the average particle size of ETFE pellets, the bulk density of ETFE pellets and the amount of hydrofluoric acid released from ETFE pellets were measured by the following methods.

Average Particle Size of ETFE Pellets

A few tens optional ETFE pellets were extracted from ETFE pellets to be measured. The long diameters and the short diameters of the respective extracted ETFE pellets were measured, and from their average values, the average particle size was obtained.

Bulk Density of Fluororesin Pellets

Measured and obtained in accordance with JIS K6891 (1964) Test Method for Molded Powder of Tetrafluoroethylene Resin.

Amount of Hydrofluoric Acid Released From Fluororesin Pellets 0.5 kg of ETFE pellets after the treatment were put into an aluminum-vapor deposited polyethylene bag (volume: 400 mL (milliliters), 330 mm in length×220 mm in width), and after sealing the periphery of the bag, stored for a predetermined number of days in an oven held at a temperature of 35° C. After the storage, the gas-phase gas in the polyethylene bag was sampled by means of a syringe, and the amount of hydrofluoric acid in the sampled gas was quantitatively analyzed by means of a gas detection tube GASTEC (No. 17, HF (hydrofluoric acid)) (manufactured by Gastec Corporation). As the volume in the polyethylene bag was 400 mL, the amount of hydrofluoric acid released per kg of ETFE pellets was calculated by the following calculation formula from the analytical result by the gas detection tube GASTEC.

Amount of hydrofluoric acid (μg) per kg of ETFE pellets=Amount of hydrofluoric acid (μg) in sampled gas as analyzed by gas detection tube GASTEC×[volume (400 mL) in polyethylene bag/amount of gas (mL) used for analysis by gas detection tube GASTEC]×[1 (kg)/amount of ETFE pellets (0.5 kg) sealed in polyethylene bag]

Ex 1

Beads of ETFE wherein the molar ratio of repeating units derived from ethylene/repeating units derived from tetrafluoroethylene was 54/46 (molar ratio) and the content of repeating units derived from $CH_2=CH(CF_2)_4F$ was 1.5 mol % in all repeating units, were melt-molded to obtain ETFE pellets 1 having an average particle size of 2.5 mm and a bulk density of 1.0 g/ml.

Into a jug made of SUS and having a volume of 3 L, 0.5 kg of ETFE pellets 1 were put. Then, 0.5 kg of warm water heated to 80° C. was put, and ETFE pellets 1 were immersed in the warm water for 30 seconds. After the 30 seconds, the warm water was filtered off, and ETFE pellets after the treatment were dehydrated by blowing 0.4 kg/cm² of air (room temperature: about 20° C.) thereto, to obtain ETFE pellets 2. Using 0.5 kg of ETFE pellets 2 obtained, the amount of hydrofluoric acid released per kg of ETFE was measured. The results are shown in Table 1.

Ex 2

ETFE pellets 1 were treated in the same manner as in Ex 1 except that in Ex 1, instead of warm water of 80° C., warm water of 40° C. was used, to obtain ETFE pellets 3. Using 0.5 kg of ETFE pellets 3 obtained, the amount of hydrofluoric acid released per kg of ETFE was measured. The results are shown in Table 1.

Ex 3

6.4 kg of ETFE pellets 1 obtained in Ex 1 were put into a container made of SUS and having a volume of 10 L, and steam of 100° C. (atmospheric pressure) was blown into the container and contacted with ETFE pellets 1 for 30 seconds for treatment. Moisture deposited on ETFE pellets after the treatment was dehydrated by blowing 0.4 kg/cm² of air (room temperature: about 20° C.) thereto, to obtain ETFE pellets 4. Using 0.5 kg of ETFE pellets 4 obtained, the amount of hydrofluoric acid released per kg of ETFE was measured. The results are shown in Table 1.

Ex 4

6.4 kg of ETFE pellets 1 obtained in Ex 1 were put into a container made of SUS and having a volume of 10 L, and warm wind of 150° C. was blown into the container at a wind velocity of 8.0 m³/hr and contacted with ETFE pellets 1 for 30 minutes for treatment, to obtain ETFE pellets 5. Using 0.5 kg of ETFE pellets 5 obtained, the amount of hydrofluoric acid released per kg of ETFE was measured. The results are shown in Table 1.

Ex 5

Using 0.5 kg of ETFE pellets 1 obtained in Ex 1, the amount of hydrofluoric acid released per kg of ETFE was measured. The results are shown in Table 1.

TABLE 1

| | Hydrofluoric acid-removing medium | Amount (μg) of hydrofluoric acid released per kg of ETFE pellets | | | |
|---|---|---|---|---|---|
| | | 1st day | 5th day | 10th day | 15th day |
| Ex. 1 | Warm water of 80° C. | 0 | 0 | 0 | 0 |
| Ex. 2 | Warm water of 40° C. | 0 | 1 | 1 | 2 |
| Ex. 3 | Steam of 100° C. | 0 | 0 | 0 | 0 |
| Ex. 4 | Warm wind of 150° C. | 4 | 1 | 1 | 1 |
| Ex. 5 | Nil | 39 | 26 | 19 | 26 |

As shown in Ex 1 to 4 in Table 1, it has been confirmed that the amount of hydrofluoric acid released can be reduced by bringing warm water of from 30 to 200° C., steam of from 100 to 200° C. or warm wind of from 40 to 200° C. into contact with ETFE pellets.

INDUSTRIAL APPLICABILITY

Fluororesin pellets obtained by the treatment method for fluororesin pellets of the present invention tend to scarcely release hydrofluoric acid even after the storage for a long period of time or the storage at a high temperature, and therefore, the acidic odor derived from hydrofluoric acid is suppressed, whereby the working environment will be improved, and the handling efficiency of the pellets will be excellent. Such fluororesin pellets are suitable for applications to various electric wire covering materials, films, etc.

What is claimed is:

1. A treatment method for fluororesin pellets, which comprises contacting fluororesin pellets obtained by melt-molding a melt-moldable fluororesin with warm water at a temperature of from 30 to 200° C. for 10 seconds to 60 minutes, steam at a temperature of from 100 to 200° C. for 10 seconds to 60 minutes, or warm wind at a temperature of from 40 to 200° C. for 30 minutes to 2 hours so that the amount of hydrofluoric acid released per kg of the resulting fluororesin pellets would be at most 5 μg as determined after the storage of the resulting fluororesin pellets at 35° C. for 15 days.

2. The treatment method for fluororesin pellets according to claim 1, wherein warm water at a temperature of from 30 to 200° C. is contacted with the fluororesin pellets for at 10 seconds to 1 minute.

3. The treatment method for fluororesin pellets according to claim 1, wherein steam at a temperature of from 100 to 200° C. is contacted with the fluororesin pellets for 10 seconds to 1 minute.

4. The treatment method for fluororesin pellets according to claim 1, wherein warm wind at a temperature of from 40 to 200° C. is contacted with the fluororesin pellets for 30 minutes to 1 hour.

5. The treatment method for fluororesin pellets according to claim 4, wherein the volume flow rate of the warm wind is from 5 to 50 m$^3$/hr.

6. The treatment method for fluororesin pellets according to claim 1, wherein the average particle size of the fluororesin pellets is from 1.0 to 5.0 mm.

7. The treatment method for fluororesin pellets according to claim 6, wherein the bulk density of the fluororesin pellets is from 0.5 to 1.5 g/ml.

8. The treatment method for fluororesin pellets according to claim 1, wherein the bulk density of the fluororesin pellets is from 0.5 to 1.5 g/ml.

9. The treatment method for fluororesin pellets according to claim 1, wherein the melt-moldable fluororesin is an ethylene/tetrafluoroethylene copolymer.

10. The treatment method for fluororesin pellets according to claim 9, wherein the ethylene/tetrafluoroethylene copolymer comprises repeating units derived from tetrafluoroethylene, repeating units derived from ethylene and repeating units derived from a compound represented by $CH_2=CX(CF_2)_nY$ wherein each of X and Y which are independent of each other, is a hydrogen atom or a fluorine atom, and n is an integer of from 2 to 8; the molar ratio of repeating units derived from ethylene/repeating units derived from tetrafluoroethylene is from 80/20 to 20/80; and the content of repeating units derived from the compound represented by $CH_2=CX(CF_2)_nY$ is from 0.01 to 20 mol % to all repeating units in the ethylene/tetrafluoroethylene copolymer.

11. A treatment method for fluororesin pellets, which comprises contacting fluororesin pellets obtained by granulating fluororesin fine particles obtained by polymerization to produce fluororesin beads and melt-molding the fluororesin beads into pellet form with warm water at a temperature of from 30 to 200° C. for 10 seconds to 60 minutes, steam at a temperature of from 100 to 200° C. for 10 seconds to 60 minutes, or warm wind at a temperature of from 40 to 200° C. for 30 minutes to 2 hours so that the amount of hydrofluoric acid released per kg of the resulting fluororesin pellets would be at most 5 μg as determined after the storage of the resulting fluororesin pellets at 35° C. for 15 days.

\* \* \* \* \*